(12) United States Patent
Shim

(10) Patent No.: US 9,806,525 B2
(45) Date of Patent: Oct. 31, 2017

(54) ENERGY STORAGE SYSTEM

(71) Applicant: LSIS CO., LTD., Anyang-si, Gyeonggi-do (KR)

(72) Inventor: Jae Seong Shim, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 98 days.

(21) Appl. No.: 14/954,791

(22) Filed: Nov. 30, 2015

(65) Prior Publication Data

US 2016/0233689 A1    Aug. 11, 2016

(30) Foreign Application Priority Data

Feb. 11, 2015 (KR) ........................ 10-2015-0021091

(51) Int. Cl.
| | | |
|---|---|---|
| *H02J 7/00* | (2006.01) | |
| *H02J 3/32* | (2006.01) | |
| *H02J 3/00* | (2006.01) | |
| *H02J 7/04* | (2006.01) | |

(52) U.S. Cl.
CPC ................ *H02J 3/32* (2013.01); *H02J 3/008* (2013.01); *H02J 7/042* (2013.01); *Y04S 50/10* (2013.01)

(58) Field of Classification Search
CPC ... H02J 3/32; H02J 3/008; H02J 7/042; Y04S 50/10
See application file for complete search history.

(56) References Cited

U.S. PATENT DOCUMENTS

2012/0323389 A1   12/2012  Shelton et al.
2014/0327404 A1*  11/2014  Markowz .................. H02J 7/00
                                                                 320/128

FOREIGN PATENT DOCUMENTS

| JP | 2005-102364 | 4/2005 |
|---|---|---|
| JP | 2007143225 | 6/2007 |
| KR | 10-2011-0078965 | 7/2011 |
| KR | 10-2011-0092714 | 8/2011 |
| KR | 10-2013-0047197 | 5/2013 |
| KR | 10-2013-0051121 | 5/2013 |
| WO | 2015136575 | 9/2015 |

OTHER PUBLICATIONS

Korean Intellectual Property Office Application Serial No. 10-2015-0021091, Notice of Allowance dated Oct. 26, 2016, 2 pages.
Korean Intellectual Property Office Application Serial No. 10-2015-0021091, Office Action dated Nov. 17, 2015, 5 pages.
Japan Patent Office Application No. 2015-253165, Office Action dated Dec. 20, 2016, 2 pages.

* cited by examiner

*Primary Examiner* — Nha Nguyen
(74) *Attorney, Agent, or Firm* — Lee Hong Degerman Kang & Waimey

(57) ABSTRACT

An energy storage system is provided. The energy storage system including a battery includes a battery management system (BMS) monitoring a battery state of the battery and controlling charging and discharging operations of the battery; and a power condition system (PCS) determining a desired control value of the battery, obtaining power market adjustment rule information on a power market including the energy storage system, calculating a deadband value for the desired control value based on the obtained power market adjustment rule information, and controlling the BMS controlling the charging and discharging operations of the battery based on the calculated deadband value for the desired control value and the monitored battery state.

6 Claims, 6 Drawing Sheets

ENERGY STORAGE SYSTEM

CROSS-REFERENCE TO RELATED APPLICATION

Pursuant to 35 U.S.C. §119(a), this application claims the benefit of earlier filing date and right of priority to Korean Patent Application No. 10-2015-0021091, filed on Feb. 11, 2015, the contents of which are all hereby incorporated by reference herein in its entirety.

BACKGROUND

The present disclosure relates to an energy system.

An energy storage system is a system that stores produced power in various associated systems including a power station, a substation and a transmission line and then uses the stored power selectively, efficiently as needed to enhance energy efficiency.

When an electrical load having a significant change according to a time zone and season is leveled to enhance the overall load factor, the energy storage system may reduce a power cost, save an investment cost and operation cost required for increasing a power facility, and so it is possible to reduce electric charges and save energy.

Such an energy storage system is being installed in a power station, a power transmission and distribution station, and home in the electrical system and performs functions, such as frequency regulation, generator output stabilization using new renewable energy, peak shaving, load leveling, a emergency power source.

The energy storage system is roughly divided into physical energy storage and chemical energy storage according to a storage method. The physical energy storage uses pumping-up power generation, compressed air storage, flywheel, etc. and the chemical energy storage uses a lithium ion battery, a lead storage battery, a Nas battery, etc.

The energy storage system also performs scheduling operations of using the stored energy in a time zone in which a power price is expensive and of storing energy in a time zone in which the power price is cheap, in association with power price bidding in a power market. It has an advantage in that it is possible to reduce a power usage cost by using the fact that the power price varies according to an amount of power generation and an amount of power usage.

Since the scheduling operations of the energy storage system using the power price only enable a desired control value to be maintained by using a power price according to a time zone, they fail to use a deadband for the desired control value according to the adjustment rule of a power market. Thus, the energy storage system repeats an operation in order to maintain the desired control value and due to the repeated operation, there is a limitation in that it fails to efficiently operate. Also, since the energy storage system fails to use an error range according to the adjustment rule of the power market, there is a limitation in that a battery control operation is unnecessarily repeated.

Thus, there is a need for a control device and control method that may operate the energy storage system within the deadband, an allowable range of the desired control value.

SUMMARY

Embodiments provide an energy storage system.

In one embodiment, an energy storage system including a battery includes a battery management system (BMS) monitoring a battery state of the battery and controlling charging and discharging operations of the battery; and a power condition system (PCS) determining a desired control value of the battery, obtaining power market adjustment rule information on a power market including the energy storage system, calculating a deadband value for the desired control value based on the obtained power market adjustment rule information, and controlling the BMS controlling the charging and discharging operations of the battery based on the calculated deadband value for the desired control value and the monitored battery state.

According to various embodiments, since an energy storage system of the inventive concept enables a battery to maintain the SOC level of the battery within a deadband value for the desired control value determined, it is possible to prevent an unnecessary battery control operation.

Also, since the inventive concept may calculate a deadband value for the desired control value of the battery based on obtained power market adjustment rule information, it is possible to maximize a benefit according to the operation of the energy storage system.

The details of one or more embodiments are set forth in the accompanying drawings and the description below. Other features will be apparent from the description and drawings, and from the claims.

DETAILED DESCRIPTION OF THE EMBODIMENTS

Figure 1:
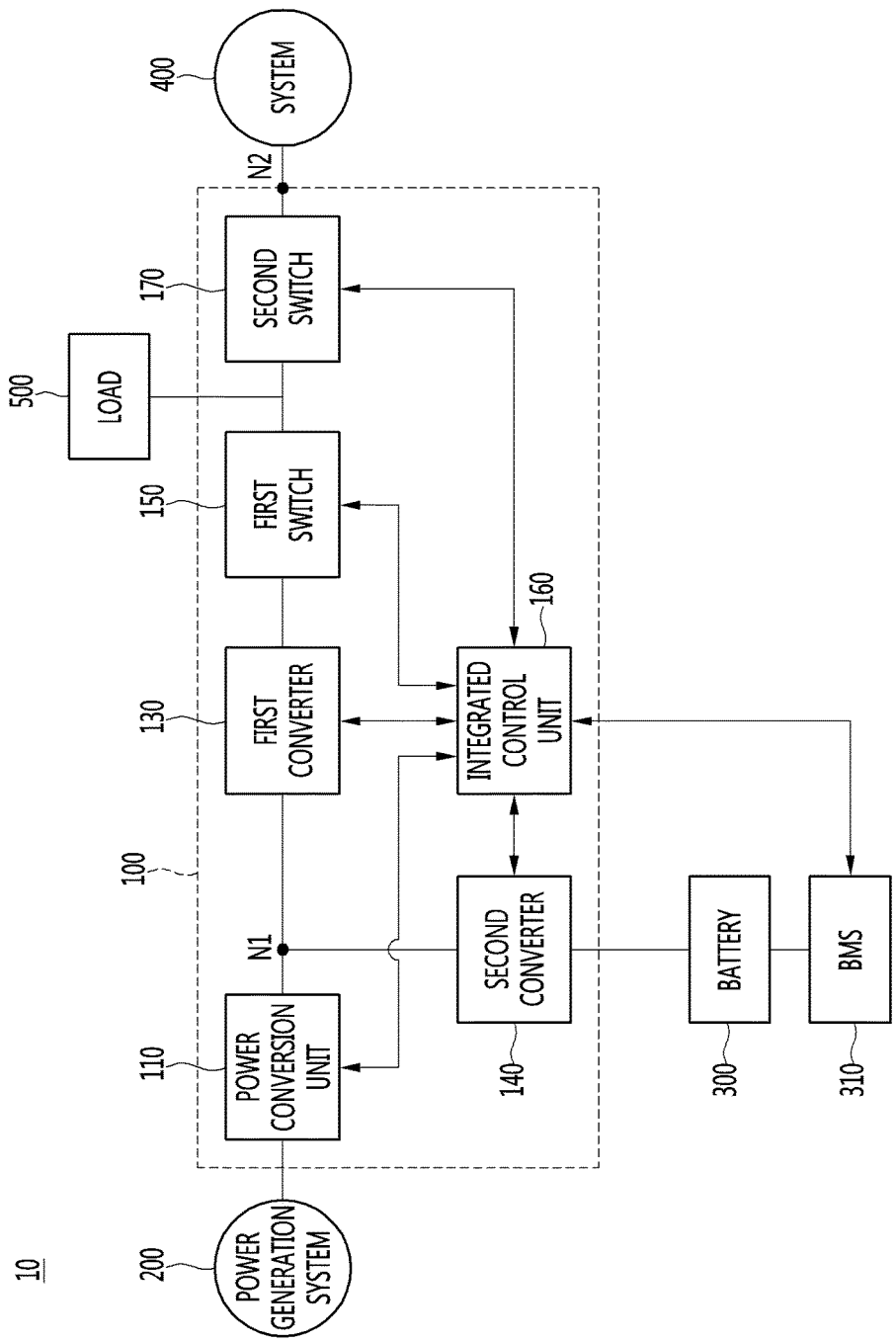
FIG. 1 is a block diagram that represents a configuration of an energy storage system according to an embodiment.

The terms or words used in the detailed description and claims should not be limitatively construed as typical meanings or meanings indicated in dictionaries but should be construed as meanings and concepts matching the technical spirit of the inventive concept based on the principle that the inventor may properly define the concepts of terms in order to describe his or her invention in the best mode.

Thus, since embodiments described in the detailed description and configurations shown in the drawings are only examples and do not cover all the technical spirits of embodiments, it should be understood that there may be various equivalents and variations that may replace them upon filing the present application.

FIG. 1 is a block diagram that represents a configuration of an energy storage system 10 according to an embodiment.

Referring to FIG. 1, the energy storage system 10 may include a power condition system (PCS) 100, a power generation system 200, a battery 300, a battery management system (BMS) 310, a system 400, and a load 500.

The PCS 100 may be a control device of the energy storage system 10.

The PCS 100 may store power generated by the power generation system 200 in the battery 300 or transmit the power to the system 400 or to the load 500. Also, the PCS 100 may transmit the power stored in the battery 300 to the system 400 or the to the load 500. The PCS 100 may also store power supplied from the system 400 in the battery 300.

Also, the PCS 100 may control the charging or discharging of the battery 300 based on the state of charge (SOC) level of the battery 300.

Also, the PCS 100 may make a schedule for the operation of the energy storage system based on the power price of the power market, the power generation plan of the power generation system 200, and the power demand of the system 400. Related described are provided below.

The power generation system 200 produces power by using an energy source.

For example, the power generation system 200 may produce power by using one or more of fossil fuel, atomic fuel, and renewable energy.

In an embodiment, the power generation system 200 may be a renewable power generation system using renewable energy, such as a solar power generation system, a wind power generation system, a tidal power generation system, etc.

The system 400 may include a power station, a substation, a transmission line, etc. The system 400 may supply power to one or more of the PCS 100 and the load 500, and also receive power from the PCS 100. In an abnormal state, the system 400 may not supply power to one or more of the PCS 100 and the load 500, and may not receive power from the PCS 100, either.

The load 500 receives power from one or more of the power generation system 200, the battery 300, and the system 400 and consumes the received power.

For example, the load 500 may include home, a large building, a factory, etc.

In the following, the PCS 100 that controls the above-described energy storage system 10 is described in detail.

The PCS 100 may include a power conversion unit 110, an integrated control unit 160, a first converter 130, a second converter 140, a first switch 150, and a second switch 170.

The power conversion unit 110 may be connected to between the power generation system 200 and a first node N1. The power conversion unit 100 may transmit power produced by the power generation system 200 to the first node N1, and convert an output voltage output to the first node N1 into a direct current (DC) link voltage. Therefore, the power conversion unit 110 may operate so that the power produced by the power generation system 200 may be supplied to one or more of the battery 300, the system 400, and the load 500.

The power conversion unit 110 may include one or more of a converter and a rectifier circuit according to the type of the power generation system 200. For example, the power conversion unit 110 may include a DC/DC converter that converts DC power into DC power, when the power generation system 200 produces the DC power. As another example, the power conversion unit 110 may include a rectifier circuit that converts alternating current (AC) power into DC power, when the power generation system 200 produces the AC power.

Also, the power conversion unit 110 may include a maximum power point tracking (MPPT) converter that performs MPPT control to be cable of maximizing power produced by the power generation system 200 according to a change in quantity of solar radiation, temperature, wind speed, etc.

The power conversion unit 110 may minimize power consumption when there is no power produced by the power generation system 200.

The integrated control unit 160 may be connected to the BMS 310 that controls the charging and discharging of the battery 300, and obtain SOC information on the SOC of the battery 300. In addition, the integrated control unit 160 may enable energy stored in the battery 300 to be transmitted to one or more of the system 400 and the load 500. Also, the integrated control unit 160 may enable power generated by the power generation system 200 to be used for charging the battery 300.

The integrated control unit 160 may compare power output from the power conversion unit 110 with an inverter output instruction value and control one or more of the second converter 140 and the first converter 130 according to the result of comparison.

For example, when the power output from the power conversion unit 110 exceeds the inverter output instruction value, the integrated control unit 160 may control one or more of the second converter 140 and the first converter 130 so that power corresponding to a difference between the output power and the inverter output instruction value is charged in the battery 300. Thus, the second converter 140 may operate in a charging mode and the first converter 130 may supply power corresponding to the inverter output instruction value to the load 500 or to the system 400.

Since the inverter output instruction value is a value lower than the power generated by the power generation system 200, the integrated control unit 160 may control the second converter 140 so that remaining power excluding the inverter output instruction value is charged in the battery 300. Thus, the SOC level of the battery 300 may correspond to a desired value.

As another example, when the power output from the power conversion unit 110 is lower than the inverter output instruction value, the integrated control unit 160 may control one or more of the second converter 140 and the first converter 130 so that the battery 300 discharges power corresponding to a difference between the inverter output instruction value the output power. Thus, the second converter 140 operates in a discharging mode and the first converter 130 supplies power corresponding to the inverter output instruction value to the load 500 or to the system. In this case, since the inverter output instruction value is a value higher than the power generated by the power generation system 200, the integrated control unit 160 may enable the battery 300 to be discharged. Thus, the SOC level of the battery 300 may correspond to a desired value.

Also, the integrated control unit 160 may control the overall operation of the PCS 100 and determine the operation mode of the power storage system 10. The integrated control unit 160 may determine operations for a first operation mode in which the generated power is supplied to the system 400, a second operation mode in which the generated power is supplied to the load 500, a third operation mode in which the generated power is stored in the battery 300, a fourth operation mode in which the power transmitted from the system 400 is stored in the battery 300, etc.

The integrated control unit may transmit a control signal for controlling the switch operation of each of the power conversion unit 110, the first converter 130, the second converter 140, the first switch 150, and the second switch 160. The control signal may mean a signal that may minimize a loss according to the power conversion of a converter or inverter through the optimal control of a duty ratio according to the input voltage of each converter or inverter. The integrated control unit 160 may receive a signal sensing a voltage, current, and temperature from one or more of the input and output of each of the power conversion unit, the first converter 110 and the second converter 140, and transmit a control signal based on the received sensing signal.

The above-described integrated control unit 160 may be included in the PCS 100 or may also be a separate component.

The first converter 130 may convert the size of a voltage, and also convert AC power into DC power or convert DC power into AC power.

The first converter 130 may include one or more of a converter and an inverter.

In an embodiment, the first converter 130 may be disposed between the power conversion unit 110 and the first switch 150. The first converter 130 may include a power converter.

Thus, the first converter 130 may convert a DC link voltage output from the power generation system 200 or from the battery 300 into an AC voltage in a discharging mode and output the AC voltage to the system 400.

Also, the first converter 130 may rectify the AC voltage of the system 400 to be capable of storing the power of the system 400 in the battery 300 in a charging mode, convert the AC voltage into a DC link voltage and output the DC link voltage to the battery 300.

The first converter 130 may include a filter for removing harmonics in the AC voltage output to the system 400.

In particular, the first converter 130 may include a phase locked loop circuit for synchronizing the phase of an AC voltage output by the first converter 130 with the phase of the AC voltage of the system 400 in order to inhibit the generation of reactive power.

Also, the first converter 130 may perform voltage variation range restriction, power factor improvement, DC component removal, transient phenomenon protection, etc. functions.

The first converter 130 may minimize power consumption when there is no need to supply one or more of power produced by the power generation system 200 and power stored in the battery 300 to one or more of the load 500 and the system 400. Also, the first converter 130 may minimize power consumption, when there is no need for the power of the system 400 while the battery 300 is charged.

The second converter 140 may convert the size of a voltage, and also convert AC power into DC power or convert DC power into AC power.

The second converter 140 may include one or more of a converter and an inverter.

In an embodiment, the second converter 140 may convert the power stored in the battery 300 into a voltage level corresponding to the first converter 130 in a discharging mode and output the converted power. For example, the second converter 140 may convert the power stored in the battery 300 into a DC link voltage through DC/DC conversion and output the converted power.

The second converter 140 may convert incoming charging power flowing through the first node N1 into a voltage level corresponding to the battery 300 in a charging mode and output the converted power. For example, the second converter 140 may convert the incoming charging power into a charging voltage through DC/DC conversion and output the converted power. In this case, the charging power may be the power produced by the power generation system 200 or the power supplied from the system 400 through the first converter 130.

The first switch 150 and the second switch 170 may be connected in series between the first converter 130 and a second node N2. Each of the first switch 150 and the second switch 170 may receive a control signal from the integrated control unit 160 and perform a switching operation based on the received control signal. Thus, each of the first switch 150 and the second switch 170 may perform on/off operations to control the flow of a current between the power generation system 200 and the system 400. Each of the first switch 150 and the second switch 170 may perform a switching operation based on the states of one or more of the power generation system 200, the battery 300, and the system 400.

In an embodiment, in the case where an amount of power required by the load 500 is greater than an amount of power transmitted to the load 500, the first and second switches 150 and 170 may be switched on so that power is transmitted from each of the power generation system 200 and the system 400 to the load 500. Also, when the power transmitted from the power generation system 200 and the system 400 to the load 500 is less than the power required by the load 500, one or more of the first switch 150 and the second switch 170 may perform a switching operation so that the power stored in the battery 300 is supplied to the load 500.

In another embodiment, when the system 400 has a power outage, the second switch 170 may be switched off and the first switch 150 may be switched on. Thus, it is possible to supply power to one or more of the power generation system 200 and the battery 300. In addition, since it is possible to interrupt power supply to the system 400, it is possible to prevent an accident that may occur when doing a job at the system 400.

The BMS 310 may be connected to the battery 300 to control the charging or discharging operation of the battery 300. Also, the BMS 310 may monitor the state of a battery that includes the SOC level, the state of charge of the battery 300. In addition, the BMS 310 may transmit battery state information on the state of the battery 300 to the integrated control unit 160. For example, the BMS 310 may monitor one or more of the voltage, current, temperature, remaining amount of power, lifespan, and charged state of the battery 300, and transmit the monitored battery state information to the integrated control unit 160.

The BMS 310 may perform a protection operation for protecting the battery 300. For example, the BMS 310 may perform one or more of over-charging protection, over-discharging protection, over-current protection, over-voltage protection, over-heat protection, and cell-balancing functions on the battery 300.

Also, the BMS 310 may regulate the SOC level of the battery 300. In particular, the BMS 310 may receive a control signal from the integrated control unit 160 and regulate the SOC level of the battery 300 based on the received control signal. Related described are provided below.

The battery 300 may receive and store one or more of the power produced by the power generation system and the power of the system 400. The battery 300 may supply stored power to one or more of the system 400 and the load 500. The battery 300 may include at least one battery cell and each battery cell may include a plurality of bare cells.

Figure 2:
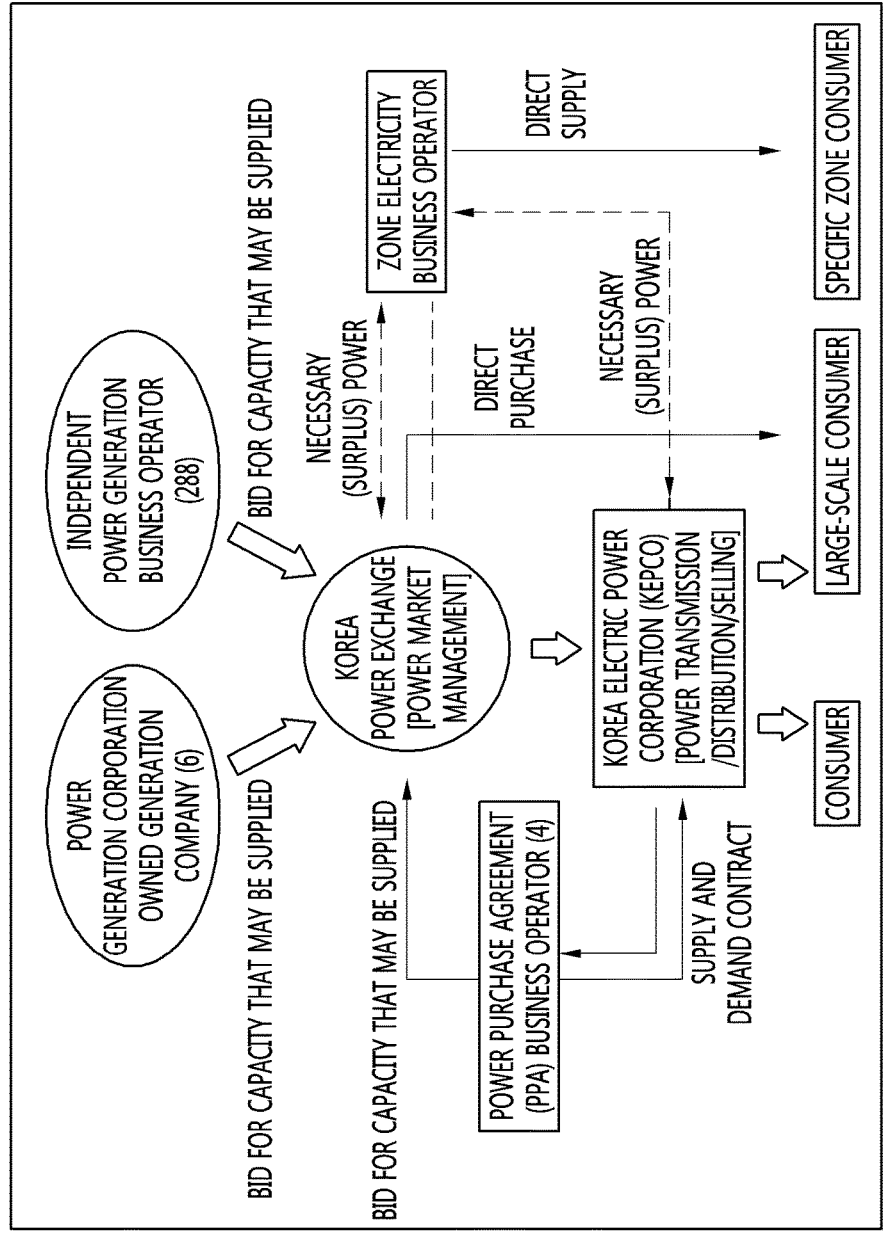
FIG. 2 is a conceptual view of a power market structure according to an embodiment.

FIG. 2 is a conceptual view of a power market structure according to an embodiment.

Referring to FIG. 2, the power market structure includes a power generation corporation owned generation company, an independent power generation business operator, a power purchase agreement (PPA) business operator, a zone electricity business operator, Korea power exchange, Korea electric power corporation (KEPCO), a consumer, a large-scale consumer, and a specific zone consumer. The above-described domestic power generation company includes six power generation corporation owned generation companies that is separated from KEPCO, and 288 independent power generation business operators in 2014.

The power generation corporation owned generation company, the independent power generation business operator, the PPA business operator, and the zone electricity business operator may mean power generation companies, may bid for a capacity that may be supplied according to an amount of power that a power generation device owned by each may generate, through the Korea power exchange, and obtain a benefit according to the bidding.

Each of the power generation corporation owned generation company and the independent power generation business operator bids for the amount of power that a generator owned by each may supply, everyday through the Korea power exchange, which manages the power market.

The KEPCO purchases power at a cost determined in the power market and supplies the purchased power to a consumer. Thus, the KEPCO is responsible for power transmission, distribution and selling.

The PPA business operator may mean a power purchase agreement business operator and bids for a capacity that may be supplied, through the power market. In addition, the PPA business operator adjusts so that a power transaction cost is applied according to a supply and demand contract with the KEPCO, not the amount determined in the power market. In addition, a corresponding adjustment rule may be included in power market adjustment rule information.

The zone electricity business operator is a business operator that produces power through a power generation facility of a certain scale and directly sells the produced power in a permitted specific zone. Also, the zone electricity business operator may directly purchase necessary power from the KEPCO or power market or sell surplus power to the KEPCO or power market.

The large-scale consumer that needs contract demand of 30,000 kW or more may directly purchase necessary power in the power market, not through the KEPCO.

In the following, a control method of a control device of an energy storage system of the inventive concept is described based on the above-described configuration and details.

Figure 3:
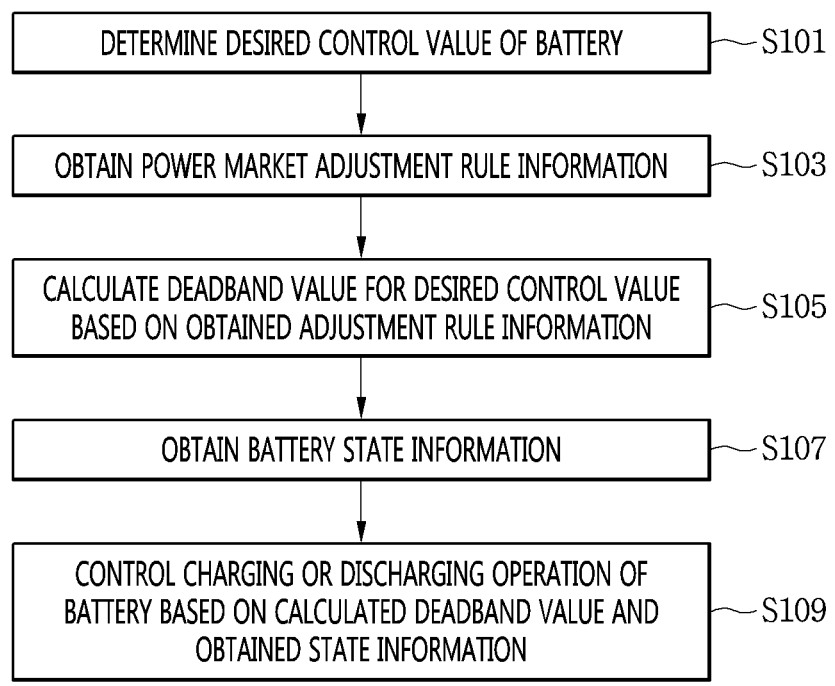
FIG. 3 is a flow chart of the operation of a control device of an energy storage system according to an embodiment.

FIG. 3 is a flow chart of the operation of the control device of the energy storage system according to an embodiment.

Referring to FIG. 3, the integrated control unit 160 determines a desired control value for the battery 300 in step S101.

The integrated control unit 160 may determine a desired control value for the charging and discharging of the battery 300 based on a power price according to a time zone, and the power production and power consumption of the power generation system 200, the system 400, and the load 500. The integrated control unit 160 may also generate the desired control value determined for the charging and discharging operations of the battery 300 in the form of scheduling according to a time zone.

Since how the integrated control unit 160 determines the desired control value for the battery 300 is known, related detailed descriptions are omitted.

The integrated control unit 160 obtains power market adjustment rule information in step S103.

The integrated control unit 160 may obtain power market data including the power market adjustment rule information from an associated server (not shown). In this case, the power market data may include one or more of a power price according to a time zone, an amount of power bid or auctioned in the power market, and a power market adjustment rule. In addition, the power market adjustment rule may include an adjusted amount for an amount of power, an adjusted amount for a capacity, and an additional adjusted amount. For example, the power market adjustment rule information may include adjustment rule information on a frequency tracking (G/F) technique.

The power market adjustment rule is disclosed in a non-patent literature "ADJUSTMENT RULE GUIDE" (published by electricity exchange, June, 2009).

The integrated control unit 160 calculates a deadband value for the desired control value based on the obtained power market adjustment rule information in step S105.

The integrated control unit 160 may calculate the deadband value for the desired control value for the battery 300 determined in step S101, based on the obtained power market adjustment rule information. The integrated control unit 160 may calculate the deadband value for the desired control value that maximizes a benefit according to the operation of the energy storage system 10, based on the obtained power market adjustment rule information.

In an embodiment, the integrated control unit 160 may obtain information on an allowable error range based on the obtained power market adjustment rule and calculate the deadband value for the desired control value based on the information on the obtained error range. For example, the integrated control unit 160 may calculate 0.96×, 1.04× as the deadband value for a determined desired control value X, when the obtained allowable error range is 4%.

The integrated control unit 160 may also calculate an asymmetric deadband value for the desired control value according to one or more of the obtained power market adjustment rule information and the determined desired control value. In particular, the integrated control unit 160 may calculate a plurality of deadband values that has different differences from the desired control value. For example, the integrated control unit 160 may calculate 0.94×, 1.02× as the deadband value for a determined desired control value X, when a deadband range according to the obtained allowable error range is 0.08.

In this example, the deadband value for the desired control value may mean an allowable error range for the desired control values. Thus, the integrated control unit 160 or the BMS 310 may control the operation of the battery 300 within a deadband value for the desired control value, when controlling the charging and discharging operations of the battery 300. Thus, the integrated control unit 160 or the BMS 310 may determine to correspond to the desired control value when a value is within a deadband value for the desired control value.

In the following, the calculation of the deadband value of the integrated control unit 160 is described with reference to FIGS. 4 to 6.

Figure 4:
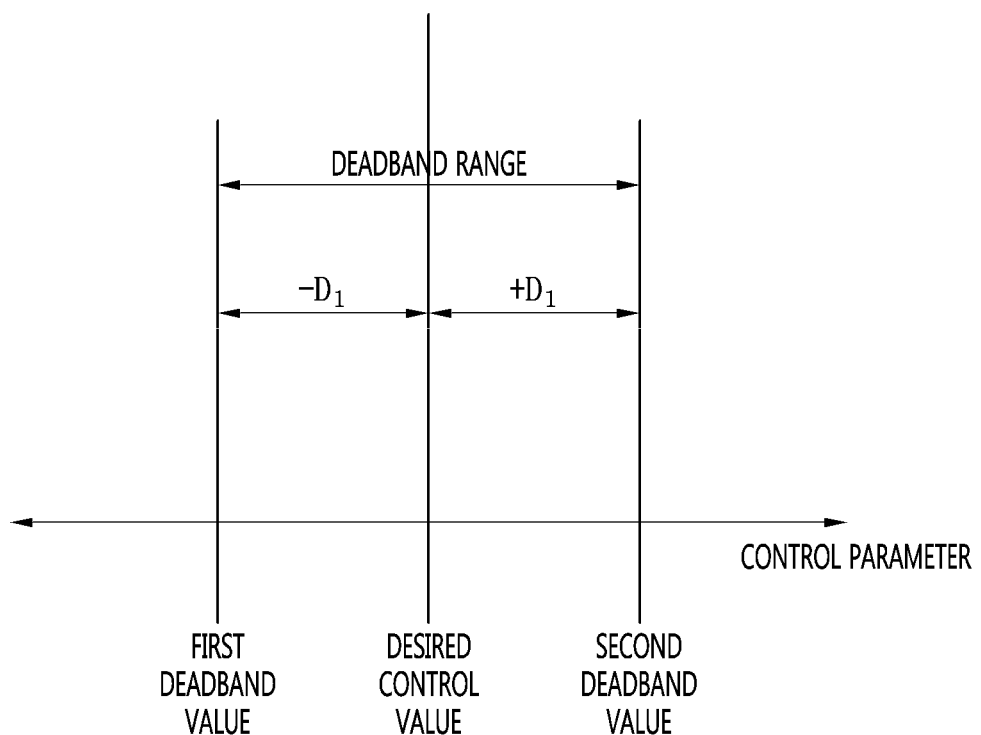
FIGS. 4, 5, and 6 are graphs that represent deadband values according to an embodiment.
Figure 5:
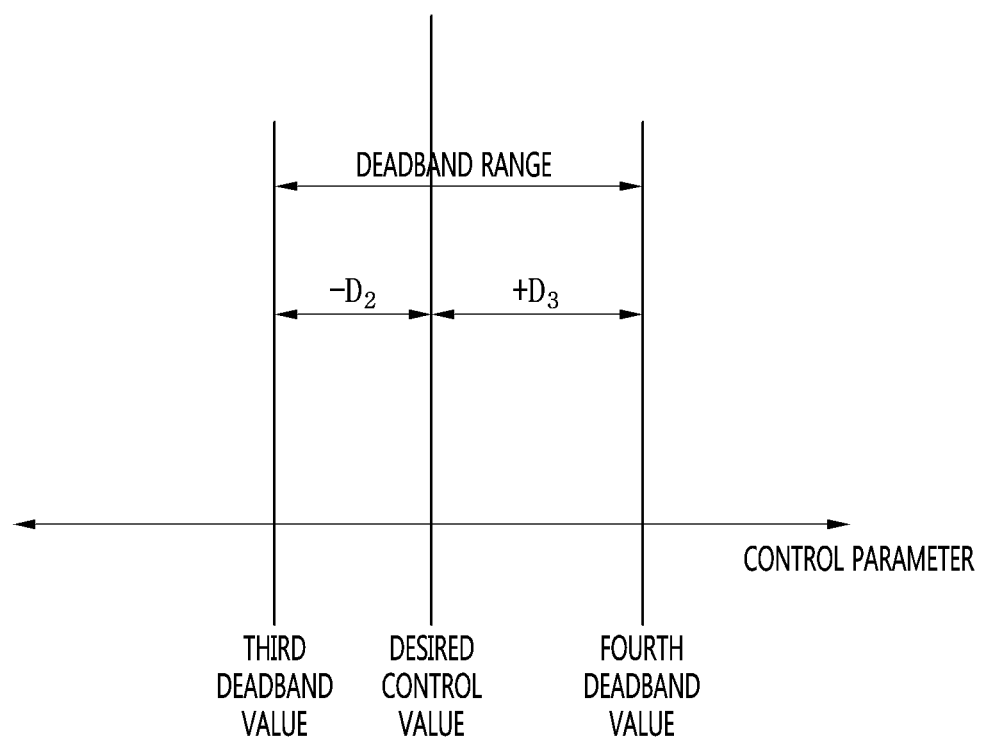
Figure 6:
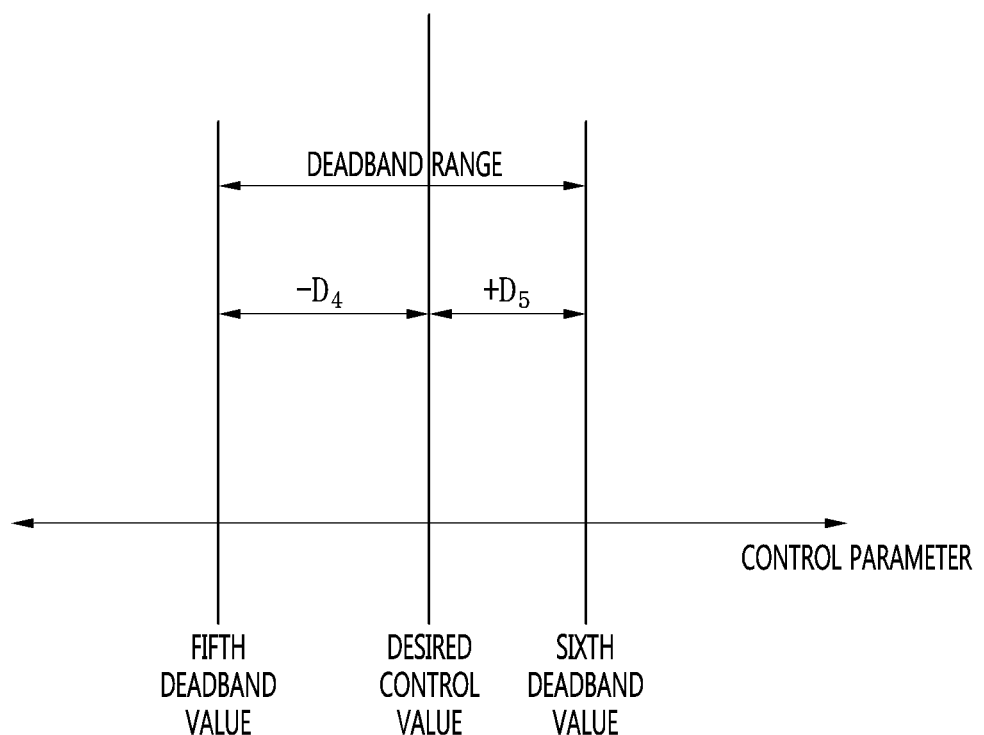

FIGS. 4 to 6 are graphs that represent deadband values according to an embodiment.

In an embodiment, referring to FIG. 4, the integrated control unit 160 may calculate a deadband range for a desired control value based on obtained power market adjustment rule information. In addition, the integrated control unit 160 may calculate a plurality of deadband values that has the same difference from the desired control value, based on the calculated deadband range. Thus, the integrated control unit 160 may calculate a first deadband value, −D1 for the desired control value and a second deadband value, +D1 for the desired control value.

In another embodiment, referring to FIG. 5, the integrated control unit 160 may calculate a deadband range for a desired control value based on obtained power market adjustment rule information. In addition, the integrated control unit 160 may calculate a plurality of deadband values that has different differences from the desired control value, based on the calculated deadband range. Thus, the integrated control unit 160 may calculate a third deadband value, −D2 for the desired control value and a fourth deadband value, +D3 for the desired control value.

In still another embodiment, referring to FIG. 6, the integrated control unit 160 may calculate a deadband range for a desired control value based on obtained power market adjustment rule information. In addition, the integrated control unit 160 may calculate a plurality of deadband values that has different differences from the desired control value, based on the calculated deadband range. Thus, the integrated control unit 160 may calculate a fifth deadband value, −D4 for the desired control value and a sixth deadband value, +D5 for the desired control value.

The desired control value, the deadband range, and the deadband value as described above may be frequencies for frequency control. Also, the deadband value may also be a single value or a table value according to a table. In this case, the table value for the deadband value may also be of a type of one or more of a vector, a matrix, and a tensor.

The details of the deadband range calculation and the deadband value calculation are only examples for explanation and the above-described integrated control unit 160 may be set according to a user's or a designer's choice.

FIG. 3 is referred back to.

The integrated control unit 160 obtains battery state information on the state of the battery 300 in step S107.

The integrated control unit 160 may obtain battery state information that includes SOC level information on the battery from the BMS 310. As described above, the BMS 310 may monitor one or more of the voltage, current, temperature, remaining amount of power, lifespan, and charged state of the battery 300, and transmit the monitored battery state information to the integrated control unit 160.

The integrated control unit 160 controls the charging and discharging operations of the battery 300 based on the calculated deadband value and the obtained battery state information in step S109.

The integrated control unit 160 may control the charging or discharging operation of the battery 300 so that the SOC level of the battery 300 is included within the calculated deadband value, based on the SOC level information in the obtained battery state information. For example, the integrated control unit 160 may control the battery control operation of the BMS 310 so that the SOC level of the battery 300 is included within the calculated deadband value, based on the SOC level information of the battery 300 obtained and the calculated deadband value. In this case, the integrated control unit 160 or the BMS 310 may control the operation of the battery 300 through frequency control.

Thus, since the energy storage system 10 of the inventive concept enables the battery 300 to maintain the SOC level of the battery within the deadband value for the determined desired control value, it is possible to prevent an unnecessary battery control operation. Also, since the inventive concept may calculate the deadband value for the desired control value of the battery based on obtained power market adjustment rule information, it is possible to maximize a benefit according to the operation of the energy storage system.

Exemplary embodiments are mainly described above. However, they are only examples and do not limit the inventive concept. A person skilled in the art may appreciate that many variations and applications not presented above may be implemented without departing from the essential characteristic of embodiments. For example, each component specifically represented in embodiments may vary. In addition, it should be construed that differences related to such a variation and such an application are included in the scope of the inventive concept defined in the following claims.

What is claimed is:

1. An energy storage system comprising a battery, the energy storage system comprising:
   a battery management system (BMS) configured to monitor a battery state of the battery and control charging and discharging operations of the battery; and
   a power condition system (PCS) configured to:
   determine a desired control value of the battery,
   obtain power market adjustment rule information on a power market comprising the energy storage system,
   obtain information on an allowable error range based on the obtained power market adjustment rule,
   calculate a deadband value for the desired control value based on the information on the allowable error range and the obtained power market adjustment rule information, and
   control the BMS controlling the charging and discharging operations of the battery based on the calculated deadband value and the monitored battery state.

2. The energy storage system according to claim 1, wherein the MBS monitors one or more of a voltage, current, temperature, remaining amount of power, lifespan, and state of charge (SOC) of the battery.

3. The energy storage system according to claim 1, wherein the battery state information comprises the SOC level information on the battery, and
   the BMS enables the SOC level to be maintained within the calculated deadband value.

4. The energy storage system according to claim 1, wherein the PCS is further configured to:
   calculate a plurality of deadband values, including a first deadband value and a second deadband value that have a same difference from the determined desired control value, based on the information on the allowable error range and the obtained power market adjustment rule information.

5. The energy storage system according to claim 1, wherein the PCS is further configured to:
   calculate a plurality of deadband values, including a third deadband value and a fourth deadband value that have different differences from the determined desired control value, based on the information on the allowable error range and the obtained power market adjustment rule information.

6. The energy storage system according to claim 1, wherein the PCS calculates the calculated deadband value as a frequency value corresponding to frequency control for the energy storage system.

* * * * *